United States Patent [19]

Graville

[11] Patent Number: 5,692,890
[45] Date of Patent: Dec. 2, 1997

[54] COMBINATION APPARATUS

[75] Inventor: Stephen R. Graville, Hunters Bar, England

[73] Assignee: The BOC Group plc, Windlesham, England

[21] Appl. No.: 574,755

[22] Filed: Dec. 20, 1995

[30] Foreign Application Priority Data

Dec. 20, 1994 [GB] United Kingdom ............... 94 25691

[51] Int. Cl.[6] ........................... F23M 3/00; F23L 7/00
[52] U.S. Cl. ........................... 431/9; 431/8; 431/115
[58] Field of Search ........................... 431/8, 9, 116, 431/115

[56] References Cited

U.S. PATENT DOCUMENTS

| | | | |
|---|---|---|---|
| 994,407 | 6/1911 | Jaubert | 431/115 |
| 2,258,515 | 10/1941 | Mowat | 431/115 |
| 2,320,821 | 6/1943 | Jimenez | 431/115 |
| 2,535,214 | 11/1950 | Willenborg | 431/115 |
| 3,545,902 | 12/1970 | Bailey | 431/9 |
| 3,990,831 | 11/1976 | Syska | 431/9 |
| 4,023,921 | 5/1977 | Anson | 431/9 |
| 4,995,807 | 2/1991 | Rampley et al. | 431/9 |
| 5,175,995 | 1/1993 | Pak et al. | |
| 5,347,958 | 9/1994 | Gordon, Jr. | 431/115 |
| 5,545,032 | 8/1996 | Jansohn et al. | 431/115 |

FOREIGN PATENT DOCUMENTS

| | | |
|---|---|---|
| 1367997 | 5/1972 | United Kingdom . |
| 2231651 | 5/1989 | United Kingdom . |

*Primary Examiner*—Carl D. Price
*Attorney, Agent, or Firm*—R. Hain Swope; Salvatore P. Pace

[57] ABSTRACT

A combustion apparatus includes a moderator gas supply which is added to the fuel to be combusted by concurrent injection to form an intimate admixture as it enters the combustion chamber. Such intimate mixture facilitates a high degree of temperature control within the combustion zone of the flame itself, thereby protecting combustion components and at least reducing or eliminating the formation of thermal $NO_x$.

12 Claims, 3 Drawing Sheets

5,692,890

COMBINATION APPARATUS

The present invention relates to a combustion apparatus and relates particularly, but not exclusively, to a combustion apparatus having means for moderating the flame temperature so as to protect components exposed to the flame and prevent 'hot spots' forming thereon. It also relates to a fuel burner capable of reducing or eliminating atmospheric nitrogen and hence thermal $NO_x$.

BACKGROUND OF THE INVENTION

It is known to use a moderator fluid to reduce the temperature of the flame at various positions within a burner. Conventional moderator fluids include steam and carbon dioxide. Typically, the moderator is injected into the combustion chamber so as to surround the flame or at least form a layer of protection between the flame and a portion of the combustion chamber to be protected. All moderators work on the principle that dissociation of the moderator in the combustion zone of the flame where ignition takes place causes the flame to lose endothermic reaction at a later stage in the flame at which point the resultant whilst $H_2O$ dissociates to $H_2+\frac{1}{2}O_2$. The dissociation is reversed by an exothermic reaction at a later stage in the flame at which point the resultant higher temperatures are less of a problem.

Many conventional fuel burners utilize air or oxygen-enriched air as an oxidant to ensure complete combustion of the fuel. While this has advantages, the atmospheric nitrogen present in such an oxidant is, at high temperatures, likely to form thermal $NO_x$ which is extremely environmentally undesirable. In accordance with the present invention, an improved combustion apparatus is provided which provides efficient flame modification without producing environmentally undesirable combustion products.

SUMMARY OF THE INVENTION

Accordingly, the present invention provides a method and apparatus for substantially complete combustion of fuels comprising the steps of creating a stream of fuel in a combustion chamber, directing an oxidizing gas at said stream to oxidize said fuel and combusting the fuel in the combustion zone of the chamber thereby forming a flame, in which a moderator gas is intimately admixed with said fuel by concurrent injection thereby lowering and controlling the combustion temperature of a first stage, or combustion zone, of said flame.

DESCRIPTION OF THE PREFERRED EMBODIMENT

In accordance with the present invention, there is provided a combustion apparatus for the substantially complete combustion of fuels comprising a combustion chamber, a burner comprising an igniting means, an inlet for directing a stream of fuel therein, an inlet for directing an oxidizing gas to the combustion chamber and an inlet for a moderator gas such that it is intimately admixed with the fuel by concurrent injection thereby lowering the temperature of the flame resulting from the combustion of the fuel. Preferably, the fuel is a liquid fuel and is admitted into the combustion chamber in an amount in excess of that required for stoichiometric combustion. Although the oxidant may be oxygen-enriched air, it is preferred that it be substantially pure oxygen. It is also preferred that the moderator gas is carbon dioxide and is added as a fuel atomizing medium. Further, it is preferred that the admixing means comprises co-axial fuel and moderator gas inlets.

Advantageously, the combustion exhaust gases of said combustion apparatus of the invention are treated so as to remove carbon dioxide therefrom which can be recirculated back to combustion apparatus to form a part of the moderator gas. This is conveniently carried out by treating the exhaust gases by first cooling in a heat exchanger and then removing any water therefrom by passage through a condenser to produce a waste gas comprising substantially pure carbon dioxide.

Figure 1:
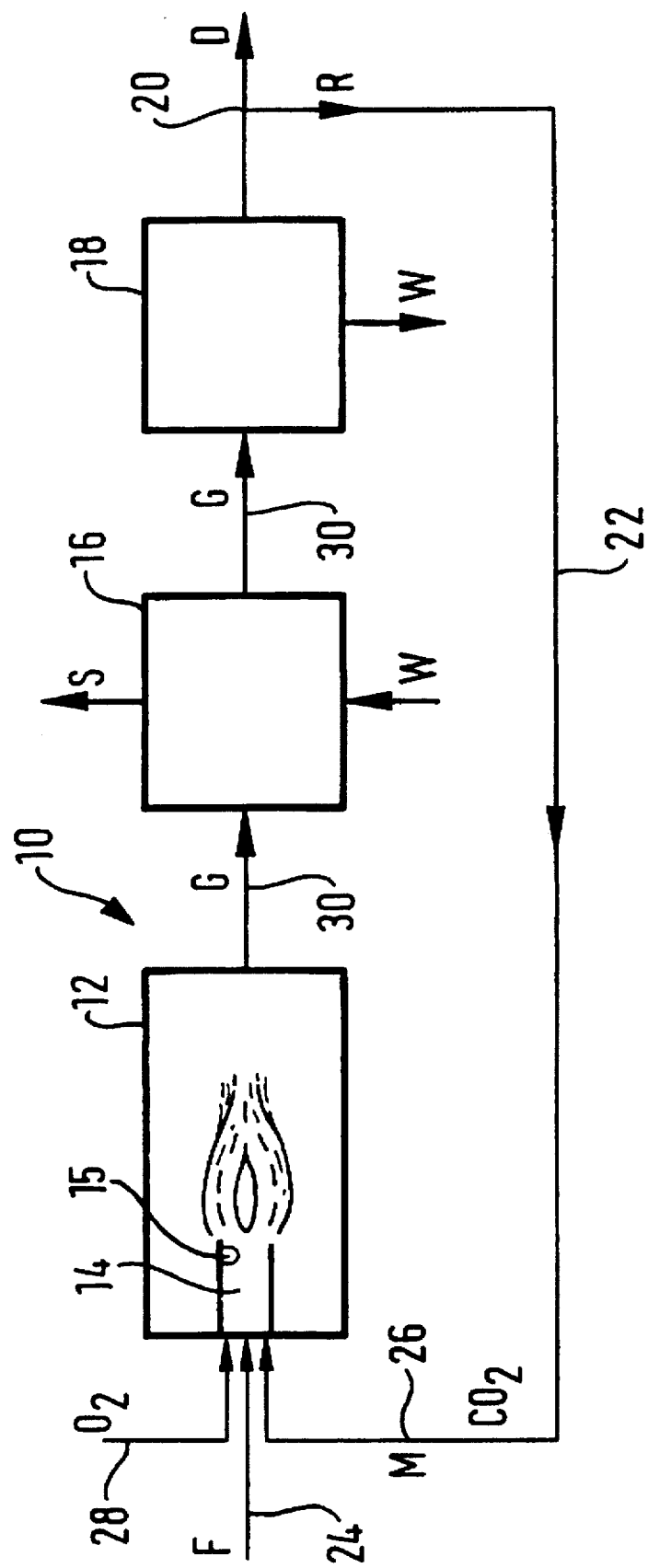
FIG. 1 is a schematic representation of a combustion apparatus according to the present invention.

An apparatus for substantially complete combustion of fuels in accordance with the present invention is illustrated in FIG. 1. The combustion apparatus 10 comprises a combustion chamber 12, a burner 14 containing a conventional igniting means 15 is supplied with fuel F through line 24, an oxidizing gas in the form of, for example, substantially pure oxygen supplied through line 28 and a moderator gas, such as carbon dioxide, supplied through line 26. A heat exchanger in the form of waste heat boiler 16 and condenser 18 of conventional design are provided downstream of the combustion chamber 12. The heat exchanger 16 acts to remove heat from any exhaust gas G in line 30 by, for example, heating incoming water W to produce steam sulfur which may be used for power generating purposes in a manner well known and therefore not discussed therein.

Condenser 18 removes water W from the exhaust gas G. By removing heat and water vapor, there is produced a waste gas substantially comprising moderator gas, i.e. carbon dioxide. If heavy fuel oils with high sulfur concentration are being combusted, substantial amounts of sulfur dioxide will be removed with the water. A 'T' junction 20 acts to split the gas into two components, the first of which R is directed back to the combustion chamber 12 via line 22 for use as a moderator, whilst the second D is sent for disposal in one of any number of conventional manners. In the case of waste carbon dioxide, disposal may be by deep sea deposit. This benefits disposal of $CO_2$ to meet future carbon tax. $CO_2$ can be cleaned and used in any one of a number of applications including the manufacture of drinks or in agriculture.

Figure 2:
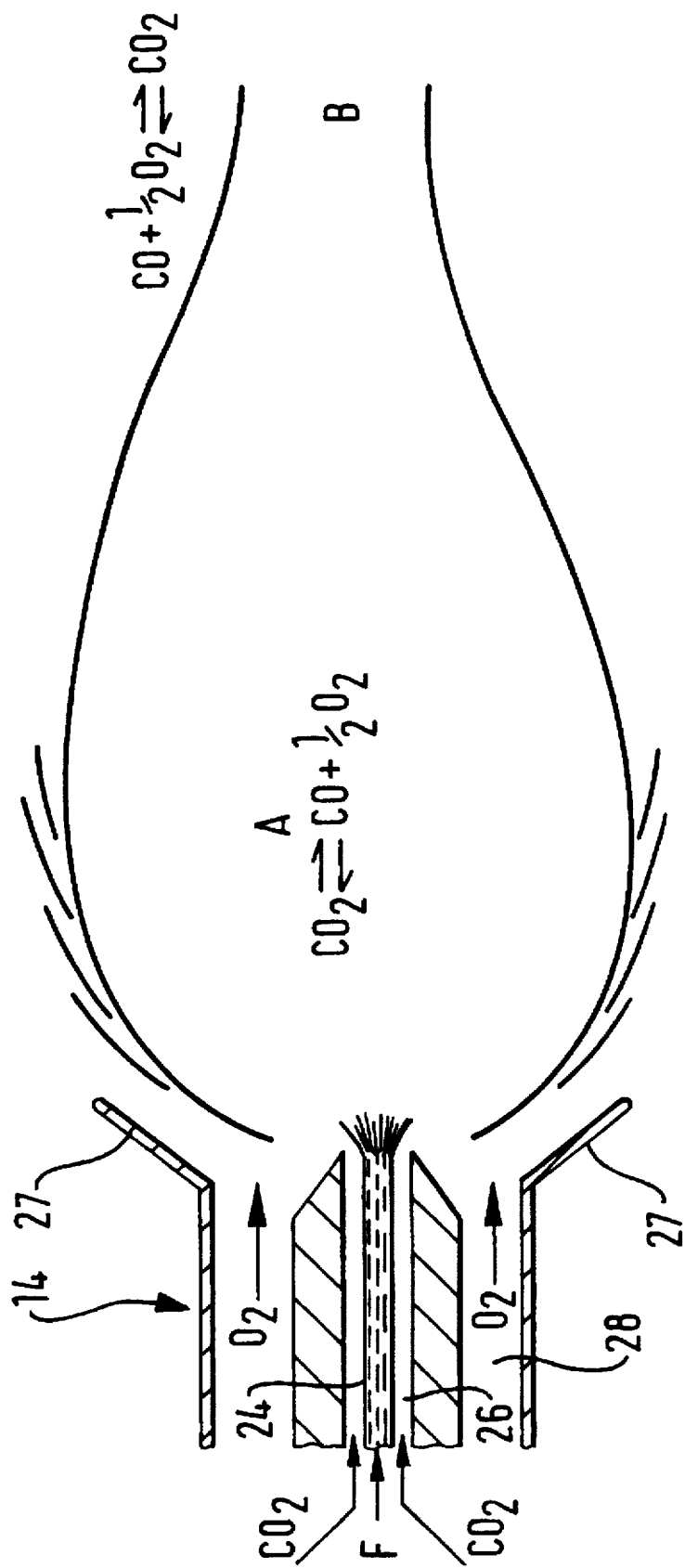
FIG. 2 is a diagrammatic representation of the burner and flame formed in the combustion apparatus shown in FIG. 1.
Figure 3:
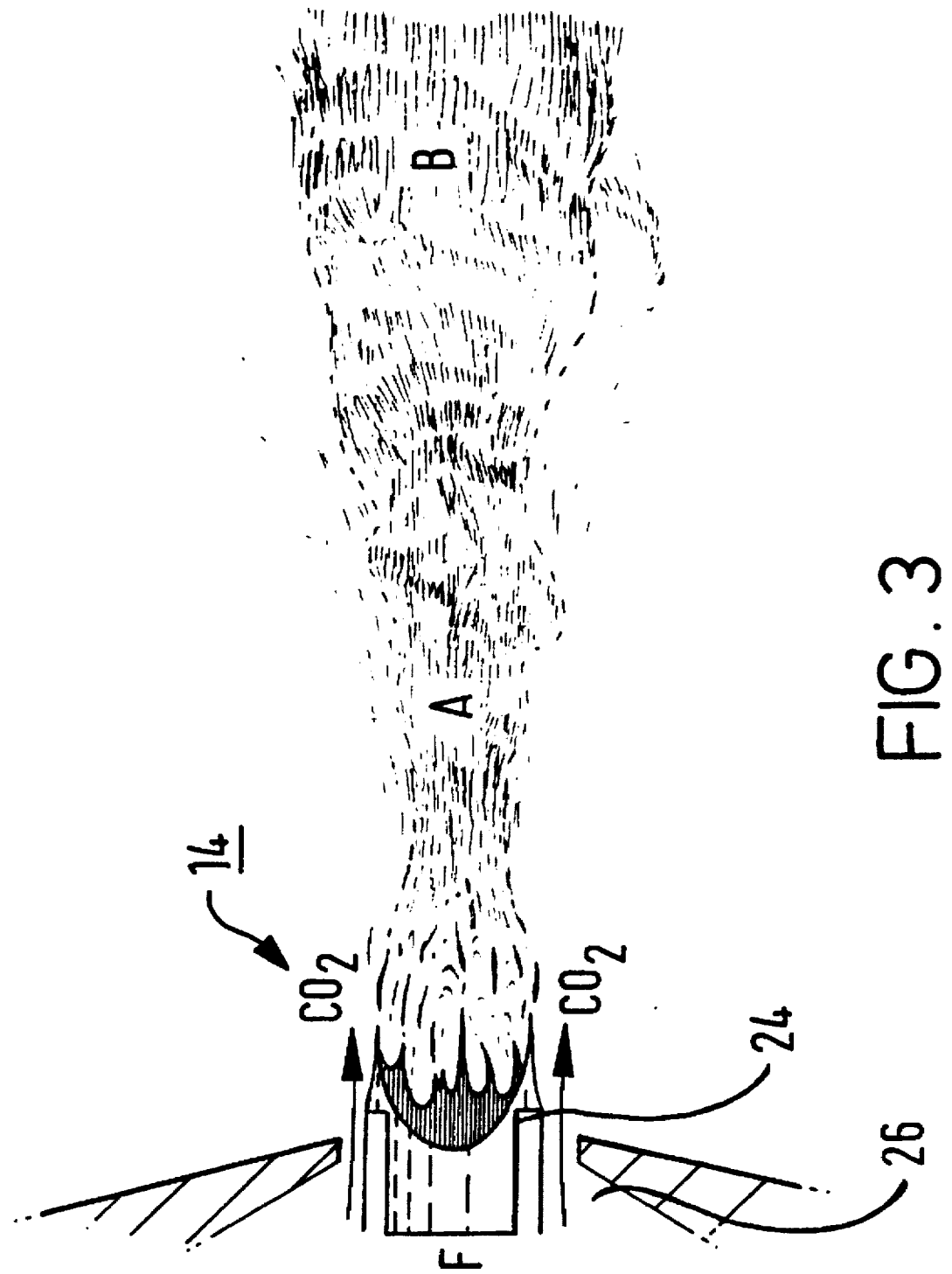
FIG. 3 is a further view of the burner and flame formed in the combustion apparatus shown in FIG. 1.

Referring now to the burner and flame detail shown in FIGS. 2 and 3, it will be seen that the burner 14 comprises a fuel supply duct 24, a moderator gas supply duct 26 and an oxidant supply duct 28. The fuel and moderator ducts 24, 26 are arranged side by side so as to facilitate the concurrent injection of fuel and moderator gas such that the moderator gas is intimately mixed with the fuel as soon as it exits the burner 14. The oxidant supply is conveniently positioned adjacent the moderator duct 26, but may be positioned slightly remote therefrom if desired as its position is somewhat less important to the present invention than that of the moderator fluid duct 26. In the particular arrangement shown in FIG. 3, the moderator duct 26 comprises an annular passage immediately surrounding the fuel supply duct 24. This arrangement is particularly useful as it allows the moderator gas to act as an atomizing agent whenever the fuel is a liquid thereby ensuring intimate mixing of the moderator gas and fuel. Even when the fuel is gas, this arrangement lends itself to efficient moderator/fuel mixing.

Referring to FIG. 2, a quarl region 27 formed by refractory material surrounds the burner 14 and acts to protect vulnerable parts of the combustion chamber 12.

In operation, fuel F and moderator gas M are supplied to the burner 14 in a manner which allow intimate mixing thereof as fuel exits the burner and forms a plume of fuel/moderator gas to which the oxidant is added. The combined mixture forms a readily combustible cocktail which is ignited by the ignition means and is, in effect, split into a first, upstream, combustion zone and a second, downstream, region denoted as A and B respectively.

The moderator gas effectively acts to cool the flame temperature in the combustion zone A immediately adjacent the burner and other temperature sensitive components and prevents the production of thermal $NO_x$ through overheating. Cooling takes place as the moderator gas dissociates through endothermic reaction and draws heat from the flame itself. Carbon dioxide, for example, dissociates to $CO+\frac{1}{2}O_2$. The components of the moderator fluid re-combine at a later stage in the flame (region B), where the temperature is less critical, through exothermic reaction. The two stage combustion process effectively reduces fuel $NO_x$ by a process known as 'staging'.

If air is used as the oxidizing gas, one will be able to limit and possibly eliminate thermal $NO_x$ from the nitrogen present in the air by controlling the flame temperature so as to keep it below that at which thermal $NO_x$ is generated. Alternatively, if oxygen is used as the oxidant, no atmospheric nitrogen will be present and one may use the moderator as a pure temperature controller so as to prolong burner life and reducing or preventing refractory damage in the quarl surrounding the burner.

It will be appreciated that, at least when substantially pure oxygen and carbon dioxide are used as the oxidant and moderator gas respectively, the present invention provides a method and apparatus which is capable of substantially complete combustion of fuels in a controlled manner which avoids the production of environmentally undesirable $NO_x$ emissions and which reduces waste to a minimum by re-cycling at least a portion of the waste product as a moderator gas. The combustion apparatus of the invention may be, for example, a glass or metal melting furnace or any other similar apparatus in which fuel is combusted to heat or melt a material being processed.

I claim:

1. In a method for the combustion of fuels in a combustion chamber comprises the steps of creating a stream of fuel in the combustion chamber containing a burner, directing an oxidant gas at said stream to oxidize said fuel and igniting said fuel to form a flame, in which a moderator gas is injected into the combustion chamber to lower the combustion temperature of the combustion zone of said flame by dissociation through endothermic reaction of components of said moderator and then re-association through exothermic reaction in a downstream region of said flame, the improvement wherein the moderator gas is concurrently injected with the fuel so as to form an intimate admixture as the fuel exits the burner.

2. A method in accordance with claim 1, wherein said fuel is a liquid fuel and said moderator gas is added as a fuel atomizing medium.

3. A method in accordance with claim 1, wherein said moderator gas comprises carbon dioxide.

4. A method in accordance with claim 1, wherein said oxidant gas comprises substantially pure oxygen.

5. A method in accordance with claim 3, wherein combustion exhaust gases of said combustion process are treated so as to remove carbon dioxide therefrom and said carbon dioxide is recirculated back to said burner to form at least part of said moderator gas.

6. A method in accordance with claim 5, wherein said combustion exhaust gases are treated by first cooling in a heat exchanger and then passing said gas through a condenser to remove any water therefrom thereby producing a waste gas comprising substantially pure carbon dioxide.

7. A combustion apparatus for substantially complete combustion of fuels comprising a combustion chamber, a burner comprising a fuel inlet for creating a stream of fuel within said combustion chamber, first supply means for supplying a moderator gas characterized by admixing means for concurrent injection of said moderator gas and said fuel thereby forming an intimate admixture thereof as the fuel enters the combustion chamber, second supply means for supplying an oxidizing gas to said combustion chamber, and ignition means for igniting said fuel/moderator/oxidant mixture thereby creating a flame, whereby the intimate admixture of the moderator gas and the fuel controls the temperature of the flame at the combustion zone thereof.

8. A combustion apparatus in accordance with claim 7, wherein said admixing means comprises co-axial fuel and moderator inlets.

9. A combustion apparatus in accordance with claim 7, wherein said fuel inlet comprises a liquid fuel inlet.

10. A combustion apparatus in accordance with claim 7, wherein said first supply means comprises carbon dioxide supply means.

11. A combustion apparatus in accordance with claim 7 including gas treatment means for removing carbon dioxide gas from the exhaust gas of said combustion chamber and for recirculating a portion of the removed carbon dioxide gas back to said combustion chamber to form at least part of said moderator gas.

12. A combustion apparatus in accordance with claim 7, wherein said treatment means comprises a heat exchanger for cooling said exhaust gas and a condenser for removing water therefrom so as to produce a waste gas comprising substantially pure carbon dioxide.

* * * * *

UNITED STATES PATENT AND TRADEMARK OFFICE
CERTIFICATE OF CORRECTION

PATENT NO : 5,692,890
DATED : Dec. 2, 1997
INVENTOR(S): Stephen R. Graville

It is certified that error appears in the above-identified patent and that said Letters Patent is hereby corrected as shown below:

Cover Page [54] and column 1, line 1.   The title "COMBINATION APPARATUS" should be changed to "COMBUSTION APPARATUS".

Signed and Sealed this

Seventeenth Day of February, 1998

Attest:

BRUCE LEHMAN

*Attesting Officer*          *Commissioner of Patents and Trademarks*